Figure 1:
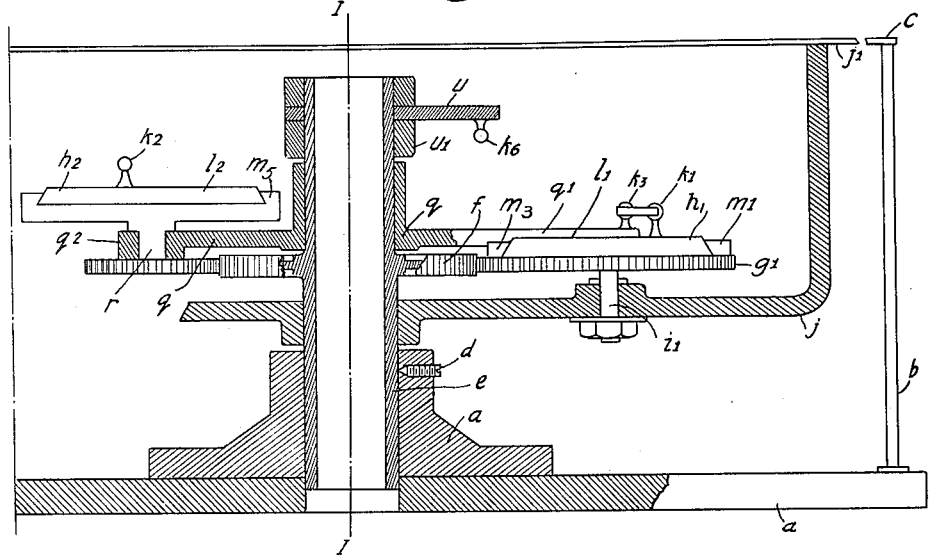

Feb. 13, 1934.  A. LEIB  1,946,703
DIRECTION FINDER COMPENSATOR
Filed May 12, 1931    2 Sheets-Sheet 1

INVENTOR
AUGUST LEIB
BY
ATTORNEY

Feb. 13, 1934.  A. LEIB  1,946,703
DIRECTION FINDER COMPENSATOR
Filed May 12, 1931   2 Sheets-Sheet 2

INVENTOR
AUGUST LEIB
BY *H. S. Gurver*
ATTORNEY

Patented Feb. 13, 1934

1,946,703

UNITED STATES PATENT OFFICE 1,946,703

DIRECTION FINDER COMPENSATOR

August Leib, Berlin, Germany, assignor to Telefunken Gesellschaft fur Drahtlose Telegraphie m. b. H., Berlin, Germany, a corporation of Germany Application May 12, 1931, Serial No. 536,795, and in Germany May 13, 1930

5 Claims. (Cl. 250—11)

This invention relates to means for insuring mechanical compensation of errors in electromagnetic direction-finders.

It is known from practice that the coarse or approximate direction finding angles represented throughout the present disclosure by $q$ as measured do not indicate the true direction of the incoming electromagnetic beam in reference to the midships axis inasmuch as metallic masses on shipboard such as hull, rigging, etc., under the action of the directive beam react upon the direction-finding antenna with the result that an apparent turn of the directive beam plane takes place. Hence, in order that the true angles represented here by $p$ of the directional beam in reference to the midships plane may be found, the apparent angles found by measure, $q$, must be corrected by applying certain corrections $f$. The shape of the correction curve $f$ as a function of the coarse direction-finding or bearing angle $q$, for a given frequency of the electromagnetic waves, depends upon the type of vessel and its actual state, i. e., its draft, and the disposition of the metallic masses reacting upon the direction-finding antenna. The shape of the curve $f$ must be known, and it may be ascertained experimentally, most suitably by comparison with results obtained by optical direction finding. The corrections $f$ thus ascertained and to be taken into consideration are usually tabulated or are graphically plotted in dependence upon the coarse bearing angles $q$. The form of the curve $f$ can be expressed by a Fourier series, thus $$f = A + B \sin q + C \cos q + D \sin 2q + E \cos 2q + ..$$

where A is a constant error which is eliminable by a corresponding turn of either the index hand or of the scale.

B sin $q$ and C cos $q$ are errors which are due to linear metallic structures mounted on shipboard. They are representable by two sinusoids displaced in relation to each other by an angle of 90 degrees, with a frequency corresponding to angle $q$ (semi-circular error). The components D sin $2q$ and E cos $2q$ express the influence due to loop-shaped structures. They are as to shape double-period sinusoids (quarter-circle error).

As a rule the errors having a quarter-circle characteristic and due to amplitudes D and E are most conspicuous. Other terms of the Fourier series with higher periodicity play a comparatively subordinate role.

In order that the labor and loss of time associated with the use of tabulations or graphs and with re-calculation may be obviated, it has been suggested in the prior art to make arrangements so that, for instance, with a stationary direction-finding scale, the mobile index hand is not adjusted in synchronism with the drive of the direction-finder antenna, but that it is coupled therewith by the use of a suitably shaped cam (guide curve) by a variable transmission gear in such a manner that the indicator hand allows of direct reading upon the scale of the corrected direction-finding angles $p$. But this scheme involves the drawback that the rigid cam shaped for definite ship conditions fails to furnish accurate corrections whenever these conditions are altered, and that it must be replaced by another one conforming with the altered conditions, not to mention the fact that the preparing of a new cam adapted to the new conditions involves a considerable loss of time.

It has also been suggested to make the cam deformable, say, in the form of flexible clips or bows adjustable by several screw spindles in certain regions or portions. However, such adjustment of the cam is tedious inasmuch as it is hard to compel the clip to assume the desired shape, so much more so as it is practically impossible in adjusting the shape of a definite part of the cam to prevent undesirable deformation or warping of other parts of the cam.

Another inventor (see Annalen der Hydrographie und maritimen Meteorologie, 1924, No. IX, pp. 240 et seq., article by Prof. H. Maurer on "Compensation of radio beacon bearing errors on shipboard direction finders") has shown that an easily readjustable device for the mechanical compensation of coarse bearing errors can be obtained if the correction of errors of semi-circular character is dispensed with. This mechanism essentially consists in that by an eccentric crank which on revolving the direction-finding antenna is rotated at double speed, a direction-finding index hand indicating the coarse bearing angle, is adjusted by corrective angles corresponding to the errors of quarter-circle character. The position of the eccentric crank upon its wheel can be adjusted and locked both in a direction corresponding to the amplitude D of the above-mentioned Fourier series as well as in the direction at right angles thereto corresponding to the amplitude E in reference to the center of this wheel. This arrangement involves the serious drawback that it leaves out the errors of semi-circular nature, though it will be understood that these are not negligible in most cases.

The present invention has as its object a device adapted to mechanically compensate coarse bearing errors both of a semi-circular as well as a quarter-circle character. In this mechanism, similarly as in Prof. Maurer's device, recourse is had to eccentric control, with the eccentric being adjusted in two directions at right angles to each other in accordance with the amplitudes of the various "decomposition" components of the said Fourier series. Arrangements are made so that, apart from the eccentric drive whose crank rotates twice as fast as the direction-finding antenna, there is further provided an eccentric drive whose crank revolves in synchronism with the direction-finding antenna, one end of said cranks controlling an arm revoluble about the axis of the direction-finder scale, the other eccentric drive being rotatably supported upon said arm, the eccentric crank of which latter drive controlling the position of the index hand for reading the true bearing angle. The first eccentric gear driving the rotatable arm, for instance, may serve for the correction of errors of semi-circular nature or shape, while the second one being supported upon the revoluble arm and controlling the index hand may serve for the obtaining of corrections of a quarter-circle nature. The first eccentric is then adjusted in accordance with amplitudes B and C, and the second one in accordance with the amplitudes D and C.

In this manner, also additional terms of the Fourier series could be taken into consideration if additional eccentric drives of a corresponding kind are provided, for instance, for the terms of $F \sin 3q + G \cos 3q$ an eccentric gear with triple speed of revolution which is supported upon a further arm revoluble about the axis of the direction-finder scale, and which with its crank drives the direction-finder index hand, while its slide is subject to control by the eccentric crank of the preceding gear. The order or sequence of the various eccentric gears may be chosen at will.

An embodiment of the device according to the present disclosure is shown by way of example in the drawing, the same referring to the case of simultaneous correction of both semi-circle and quarter-circle errors which probably is most important in practice.

Figure 2:
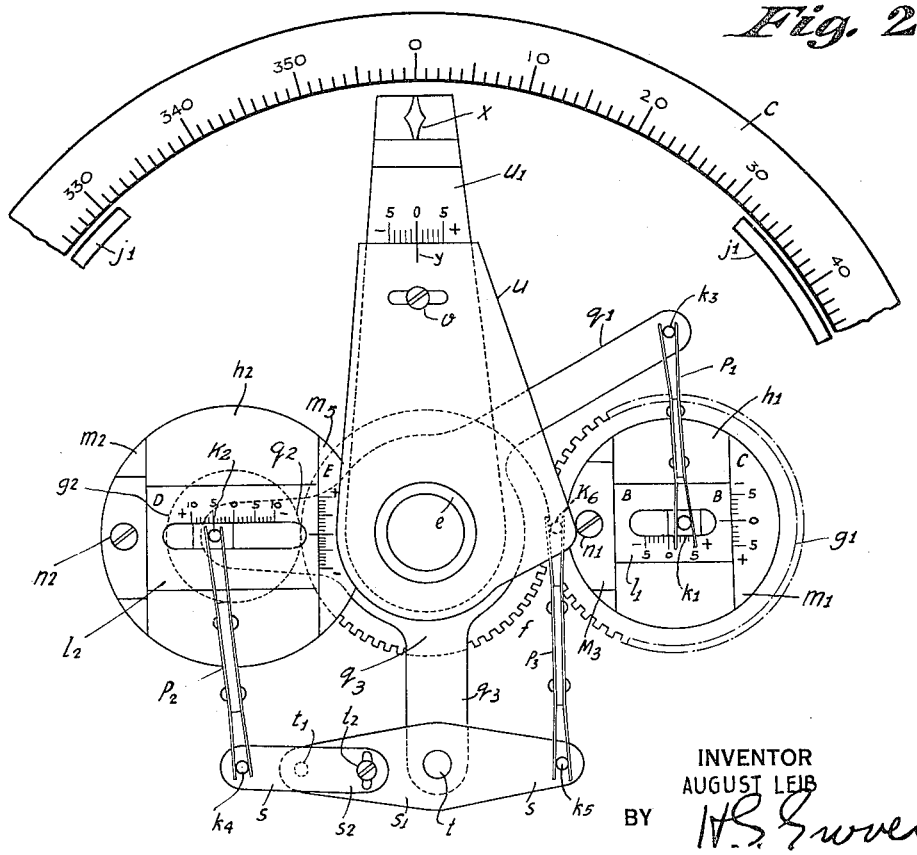
Figure 3:
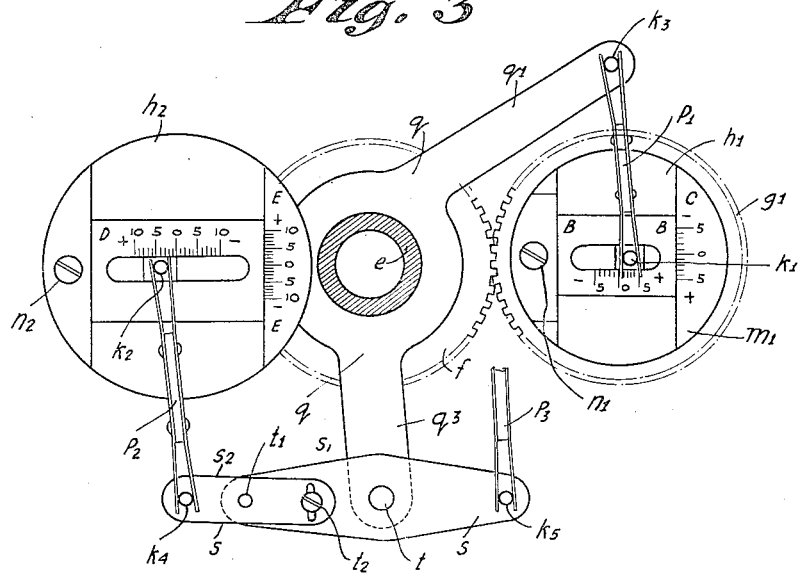
Figure 4:
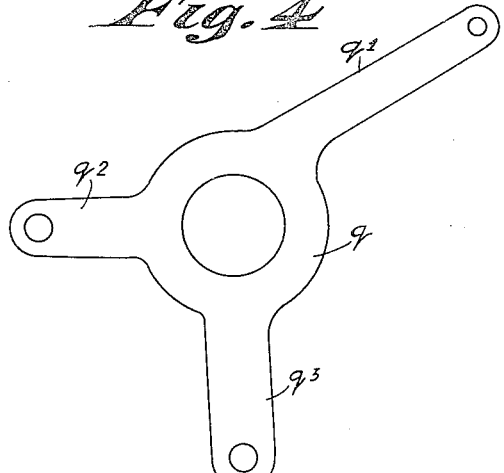
Figure 6:
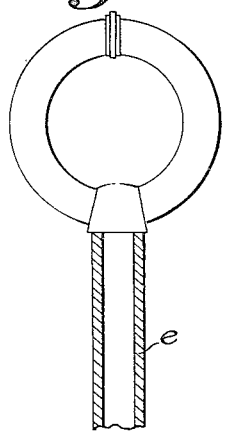
Figure 5:
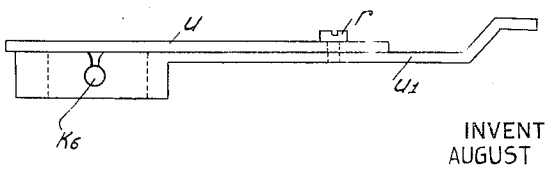

Figure 1 is a vertical section of a mechanism as here disclosed. Figure 2 is a top view, Figure 3 the same top view with index hand removed. Figure 4 is a slide coupling the two eccentric drives and revolvable about the axis of the scale, Figure 5 finally being a side view of the direction-finder index hand, and Fig. 6 is an elevation of the loop and its associated driving spindle.

Secured to a stationary frame $a$, for instance, by means of several vertical bolts $b$, are the direction-finder scale $c$ and an immobile tooth-wheel $f$ by means of a hollow shaft $e$ secured, for example, by the screw $d$. In meshing engagement with the fixed tooth-wheel $f$ are the tooth-wheels $g_1$ and $g_2$ belonging to two different eccentric drives $h_1$ and $h_2$. The tooth-wheel $g_1$ is supported with its shaft $i_1$ in a member $j$ rotatable around the spindle I—I of the direction-finder scale and reproducing the movements of the direction-finding antenna. Of the said member $j$ only a part is shown in Figure 1. The coupling with the direction-finder wheel is not shown. The same may be effected in any desired manner, for instance, also by the aid of a rope drive. The said member $j$ may suitably have the form of a pot being open on top whereby the entire tooth-wheel gear is enclosed.

The radius of the tooth-wheel $g_1$ is equal to that of the fixed wheel $f$ so that when the member $j$ conjointly with the direction-finder antenna makes one revolution, the planetary wheel $g_1$ rolls once upon the wheel $f$, in other words, that it goes through one revolution in relation to the space referred to member $j$. Adjustably attached to the top of the wheel $g_1$ is an eccentric crank $k_1$. The eccentric crank $k_1$ in the direction longitudinally of the slide is adjustable in the slide $l_1$ and in the other direction together with the slide along the guides $m_1, m_3$. Locking in position may be effected, for instance, by means of a clamp nut $n_1$. The adjustment of the eccentric crank $k_1$ in the slot of the slide $l_1$ is effected by hand by the aid of the scale provided upon the slot edge in accordance with the experimentally determined value of amplitude B of corrective term $B \sin q$. In a similar way is effected the adjustment of the slide in the guide $m_1 m_3$ by the aid of the second scale for amplitude C.

Through the agency of a guide rod $p_1$ eccentric crank $k_1$ controls an arm revolvable around the hollow spindle $e$. This arm may be given any desired shape compatible with the construction. In the present instance, as illustrated in Figure 4, it is furnished with three arms $q_1, q_2, q_3$. The arm $q_1$ bears the crank $k_3$ at which engages the guide rod $p_1$. Supported upon the arm $q_2$ is the second eccentric drive $h_2$ whose shaft $r$ carrying the tooth-wheel $g_2$ below is passed through the opening $o$ of the slide $q$.

The radius of tooth-wheel $g_2$ is half that of the radius of fixed wheel $f$ so that upon one rotation of the direction-finder antenna end of the body $j$, the wheel $g_2$ rolls twice over $f$, in other words, so that it completes two rotations relative to the space occupied by body $j$. The eccentric $k_2$ thus furnishes the correction of errors of quarter-circle nature. Similarly as the eccentric crank $k_1$, it is adjustable, to be more precise, in one direction it is shiftable in the slot of slide $l_2$ along the scale for amplitudes D of the term $D \sin 2q$, and in the other direction being at right angles to the former conjointly with the slide $l_2$ in the guide-ways $m_2 m_5$ along the scale for the amplitude E corresponding to term $E \cos 2a$.

By means of a suitable guide rod mechanism, the eccentric $k_2$ controls the direction-finder index hand $u, u_1$. It would also be feasible to design the guide rod mechanism and the direction-finding pointer carrier $u$, and pointer $u_1$, with a convenient crank lever in a way so that the guide rod $p_2$ engages directly at said crank lever arm. For greater approximation to the desired correction law, it is preferable, however, to design the said controlling means like a balance gear as shown in Figures 2 and 3. Here the guide rod $p_2$ engages at a crank $k_4$ of the double-armed balancing lever $s$ which with its spindle $t$ is revolvably supported in the arm $q_3$ of slide $q$, and whose crank $k_5$ is coupled by means of guide rod $p_3$ with the crank $k_6$ of the direction-finder index-hand carrier $u$.

It is recommendable to constitute the balance $s$ of two parts $s_1$ and $s_2$ in pivotal relationship by the pin $t_1$, said parts being lockable in relation to each other by the aid of a clamp screw $t_1$. The adjustment in reference to each other of these two parts by means of a clamp screw has the object to compensate such inaccuracies as has been occasioned by the adjustment of the eccentric cranks $k_1$ and $k_2$ in their slides.

To take into consideration and correct the constant error A the index-hand carrier consists of two parts $u$ and $u_1$ being adjustable to each other. To eliminate this error, part $u_1$ is turned in reference to part $u$ about the vertical axis I I of the scale (see Figure 1) until the marker line $y$ of part $u$ (see Figure 2) cuts off upon the adjacent scale of part $u_1$ a portion corresponding to the error A, whereupon both these parts are locked in their relative position by means of a clamp screw $v$.

The indicator line $x$ serves for reading the true bearing angle $p$ upon the fixed direction-finder scale $c$.

The operation of the device as hereinbefore described is as follows:

If the two eccentrics $k_1$ and $k_2$ are in their central position upon the spindle of the planetary wheels supporting them, the entire transmission gear between body $j$ and the pointer carrier $u_1$ acts like a rigid coupling so that the pointer $x$ reproduces (or shows) the movements of the body $j$ and the direction-finding antenna exactly. If then the eccentric crank $k_1$ is shifted out of its middle position in accordance with the amplitudes of B and C, the slide $k$ as the body $j$ rotates will be driven along, but not in synchronism therewith, but rather with deviations which with practically sufficient correctness, compensate the errors of a semi-circular character B sin $q$ and C cos $q$. And this motion of $q$ is identically transmitted to the direction-finding pointer carrier since in the central position of the eccentric $k_2$ the part of the gear between $q$ and $u$ acts like a rigid clutch.

If, then, also the eccentric $k_2$ is shifted out of its central position corresponding to the amplitudes D and E of the error terms D sin $2q$ and E cos $2q$, $u$ will no longer move in synchronism with the slide $u$, but rather depart therefrom by the angles which with practically sufficient accuracy correspond to the errors with quarter-circle shape. Thus the corrections effected by the two eccentrics $k_1$ and $k_2$ are aggregated so that the pointer $x$ (with the two parts $u_1$ and $u$ being suitably locked in accordance with the correction of the constant error A) will now indicate with practically adequate accuracy the true bearing angle upon the direction-finder scale $c$.

The arrangement hereinbefore described is readily adaptable to the changed conditions arising upon alterations in condition or state of the vessel. All that is then necessary is to ascertain experimentally, most preferably by comparison with optical direction finding, the error values $f$ for eight values of the angle $q$ differing each by 45 degrees, that is to say, for 0, 45, 90 etc., degrees in order to calculate with sufficient accuracy the values of A.B.C.D and E by the aid of the known formulae. Next the marking line $y$ is fixed upon its scale in conformity with the determined error A, and locked in that position by the clamp screw $v$. Then the body $j$ is placed in the position corresponding to the zero of angle $q$ so that the counter-mark made on the margin $j_1$ (not shown in the drawings) will be located opposite division 180 degrees of the direction-finder scale. Eccentrics $k_1$ and $k_2$ are then set to the divisions of the D scale and the B scale corresponding to the new values of D and B, respectively, and their slides adjusted to the zero positions of the corresponding E and C scales. Since the pointer $x$ must then be opposite the zero division of the scale, in case of deviations from this position, the clamp screw $t_2$ is to be loosened and the relative position of the two links $s_1$ and $s_2$ be altered until the pointer has been restored to zero position. Thereupon the clamp screw is tightened again, and the displacement of the eccentric slides can be effected along their guide ways in accordance with the newly found values of C and E.

It goes without saying that the embodiment hereinbefore described does not exhaust the forms of construction that are possible inside the scope and spirit of this invention.

For instance, the drives which connect each eccentric with the element controlled thereby, could be altered in a great many ways. Furthermore, the part played by the direction-finder pointer and the scale could be exchanged in that the pointer is disposed fixedly in the ship, while the scale with the direction-finding antenna is arranged movably.

Moreover, for each of these modifications another kinematic reversal is conceivable. For instance, the modification hereinbefore described comprising a pointer $x$ and stationary scale $c$ could be changed in such a way that the mechanical reading correction is effected not by corresponding lead or lag of the pointer $x$ relative to the body $j$, but in the case of a pointer $x$ rigidly connected with $j$, that is, moved in synchronism with the direction-finding antenna this could be effected by corresponding adjustments of the scale $c$ relative to its zero position. In that instance the central tooth wheel $f$ should be disposed so as to revolve in synchronism with the direction-finding antenna, whereas the tooth-wheel of the first eccentric drive, for instance, $g_1$, must be revolvably supported in a fixed bearing, while $u$, $u_1$ will carry the scale $c$ rather than the pointer $x$.

Having thus described my invention and the operation thereof, what I claim is:

1. Means for the mechanical compensation of coarse direction-finding errors in electromagnetic direction finding, comprising a radiant absorbing means, a pointer and a scale, a concentric operating spindle and a plurality of planetary wheels, several eccentric drives arranged to rotate with said spindle so that each eccentric is displaceable upon its planetary wheel which revolves by a transmission gear corresponding to the frequency of the error component to be corrected, in two directions at right angles to each other corresponding to the two amplitudes of these components, one of said eccentrics controlling the direction-finder pointer carrier, while each of the other eccentrics controls a crank arm revolvable about the axis of the direction-finder scale upon which slide the next eccentric drive is supported revolvably.

2. A radio direction finder adapted to indicate the true pointer position of a source of radiant energy signals comprising radiant energy absorbing means, a pointer and a scale, a concentric operating spindle attached to said radiant absorbing means, a first planetary gear attached to and fixed to rotate with said spindle, a second planetary gear arranged to rotate simultaneously with said first gear, and adjustable eccentric means attached to said second gear to compensate for the errors of a quarter-circular character, a third planetary gear arranged to rotate at double the speed of said first and second gears, adjustable eccentric means attached to said second gear to compensate for the errors of a semi-circular character, and linking mechanism connected to said pointer, and both said eccentric means for indicating on said scale the true position of said radiant energy source.

3. A radio direction finder adapted to indicate the true pointer position of a source of radiant energy signals comprising radiant energy absorbing means, a pointer and a scale, a concentric operating spindle attached to said radiant absorbing means, a first planetary gear attached to and fixed to rotate with said spindle, a second planetary gear arranged to rotate simultaneously with said first gear, and adjustable eccentric means attached to said second gear to compensate for the errors of a quarter-circular character, a third planetary gear arranged to rotate at double the speed of said first and second gears, adjustable eccentric means attached to said second gear to compensate for the errors of a semicircular character, both of said eccentric means being arranged to control said scale for indicating the true position of said radiant energy source.

4. Means for the mechanical compensation of coarse direction-finding errors in electromagnetic direction finding, comprising a radiant absorbing means, a pointer and a scale, a concentric operating spindle, a plurality of planetary gears, several eccentric drives, and a crank arm arranged to rotate with said spindle so that each eccentric is displaceable upon a planetary gear which revolves by a transmission gear corresponding to the frequency of the error component to be corrected, in two directions at right angles to each other corresponding to the two amplitudes of these components, one of said eccentrics controlling the direction-finder pointer carrier, while each of the other eccentrics controls said crank arm revolvable about the axis of the direction-finder scale upon which slide the next eccentric drive is supported revolvably, and controlling the direction-finder scale.

5. A radio direction finder adapted to indicate the true pointer position of a source of radiant energy signals comprising radiant energy absorbing means, a pointer and a scale, a concentric operating spindle attached to said radiant absorbing means, a first planetary gear attached to and fixed to rotate with said spindle, a second planetary gear arranged to rotate simultaneouly with said first gear, and adjustable eccentric means attached to said second gear to compensate for the errors of a quarter-circular character, a third planetary gear arranged to rotate at double the speed of said first and second gears, adjustable eccentric means attached to said second gear to compensate for the errors of a semicircular character, and linking means connected to both said eccentric means for indicating the true position of said radiant energy source by means of said pointer and scale.

AUGUST LEIB.